2 Sheets—Sheet 2.
A. HEARST.
Corn-Planter.
No. 228,258. Patented June 1, 1880.
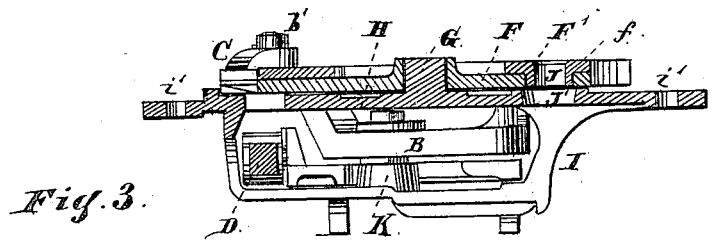
Fig. 3.
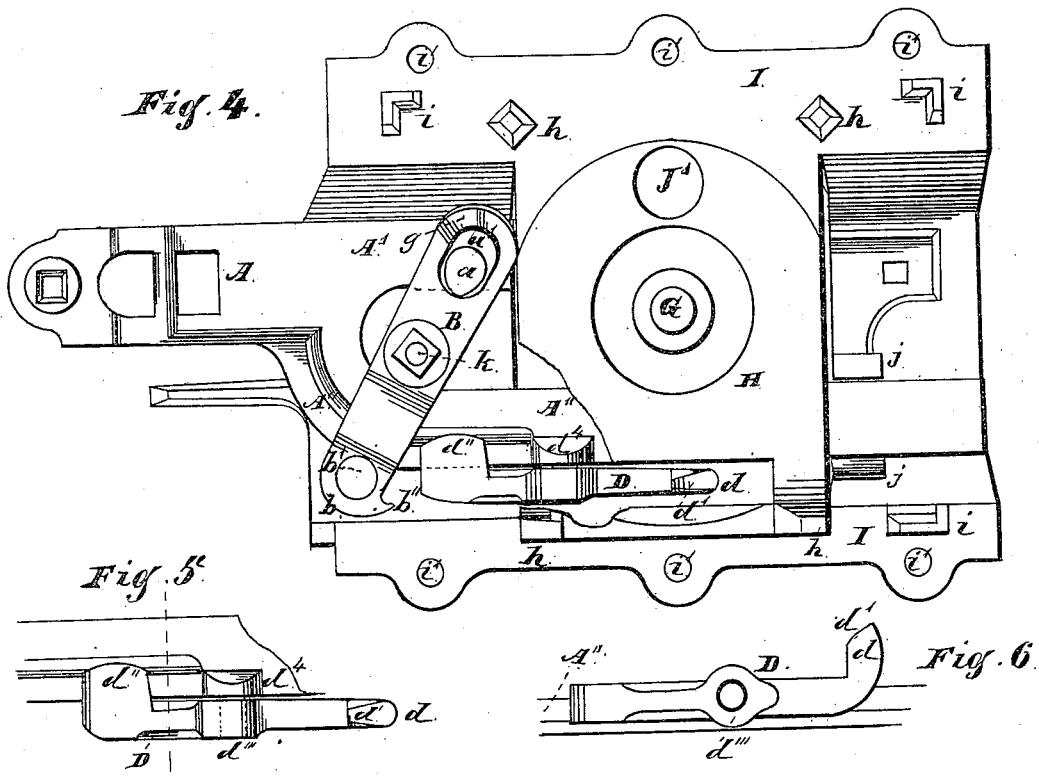
Witnesses:
Geo. Boud.
H. F. Bruns.
Inventor:
Alexander Hearst
By West & Boud Attys.

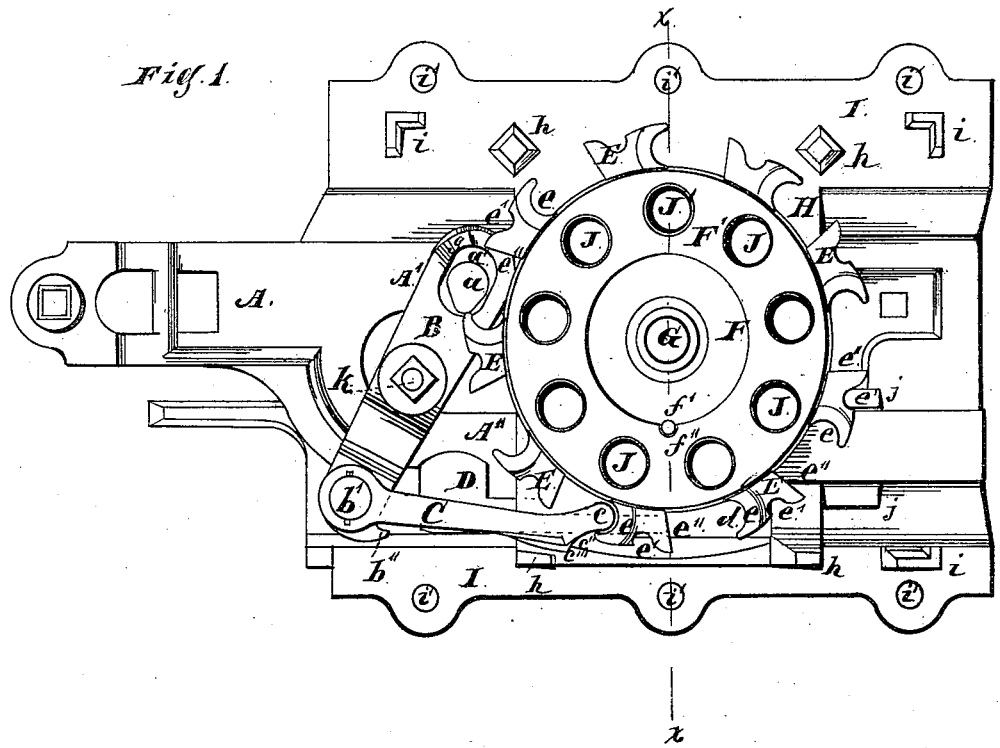

UNITED STATES PATENT OFFICE.

ALEXANDER HEARST, OF PEORIA, ILLINOIS.

CORN-PLANTER.

SPECIFICATION forming part of Letters Patent No. 228,258, dated June 1, 1880.

Application filed October 22, 1879.

*To all whom it may concern:*

Be it known that I, ALEXANDER HEARST, residing at Peoria, in the county of Peoria and State of Illinois, and a citizen of the United States, have invented a new and useful Improvement in Corn-Planters, of which the following is a full description, reference being had to the accompanying drawings, in which—

Figure 1 is a top or plan view of the seed wheel or disk support and devices for operating the wheel or disk; Fig. 2, a side elevation of the same; Fig. 3, a cross-section on line $x$ $x$ of Fig. 1; Fig. 4, a top or plan view with the seed wheel or disk and the upper dog or pawl removed; Figs. 5, 6, and 7, details of the lower dog or pawl.

This invention relates to the seed-dropping devices in that class of seed-planters in which the seed is delivered from the seed boxes or hoppers into the seed-tubes, by which it is deposited in the ground through the medium of an intermittently-rotating seed wheel or disk having a series of cavities or cells to receive a charge of seed, and has for its object the controlling of the movements of the seed wheel or disk by devices arranged and operating to produce an intermittent rotary movement of the wheel or disk in such manner that the wheel or disk will be actuated by a push action in each starting, and will be stopped at the termination of each forward, movement of the actuating devices, and to improve the construction and operation of the seed wheel or disk and the devices by which it is operated; and its nature consists in providing a seed wheel or disk with wings or projections located on its periphery and having an arrangement of notches and faces for engaging with the starting and stopping devices; in providing an oscillating lever carrying a stop at each end and operating one of the pawls or dogs; in providing a reciprocating bar operating the other pawl and the oscillating lever; in arranging the reciprocating bar and the oscillating lever in such relation with each other that their respective pawls will be given a push movement for moving the seed disk or wheel; in providing a reciprocating bar and an oscillating lever for receding one pawl as the other is advanced in the same side of the seed wheel or disk, and in the several parts and combination of parts hereinafter set forth as new.

In the drawings, A represents the reciprocating bar; B, the oscillating arm or lever; C, the upper dog or pawl; D, the lower dog or pawl; E, the wings or projections; F, the seed wheel or disk; F', the removable annular ring having the seed-cells; G, the stud or pin for the seed wheel or disk; H, the cross-plate or support for the seed wheel or disk; I, the surporting-frame; J, the seed cells or cavities; J', the opening leading to the seed-tube; K, the stud or pivot for the oscillating lever or arm; $a$, the pin or projection on the end or the arm A' of the reciprocating bar A; $a'$, the slot in the end of the arm or lever B; $b$, the end of the arm or lever B, to which the upper pawl or dog, C, is attached; $b'$, the pin or stud for attaching the upper pawl; $b''$, the hook or projection acting as a stop for the wheel or disk F; $c$, the engaging end of the upper pawl; $c'$, the incline in the under face of the upper pawl or dog; $c''$, the cut-away portion of the same; $c'''$, the side projecting flange or edge of the same; $d$, the engaging end of the lower pawl or dog; $d'$, the curved or inclined upper face of the same; $d''$, the stop or rest; $d'''$, the pin or pivot; $d^4$, the ear on the arm or end A'' of the reciprocating bar for supporting the lower pawl or dog; $e$, the notch or opening in the wings or projections E, with which the ends of the pawls or dogs engage; $e'$, the notch or opening in the wings or projections E for engaging the hook or point $b''$; $e''$, the inclined face of the wings E, for engaging the stop $g$; $f$, the flanges around the openings J, for entering the corresponding openings in the wheel or disk F and locking the ring F'; $f'$ $f''$, the pin and notch forming guides for properly centering the ring F' and wheel or disk F; $g$, the projection on the lever or arm B, forming a stop; $h$, the lugs or projections for supporting the plate carrying the cut-off; $i$, the openings for attaching the support I to the frame of the machine; $i'$, the lugs or projections forming stops or guides for the hopper; $j$, the guides for the arm A''; $k$, the bolt for holding the arm or lever B in position on its pivot or pin K.

The bar A has a short arm or extension, A', and a long arm or extension, A″, with an opening or space between them, and is to be reciprocated in any well-known manner back and forth on the upper face of the depressed or bottom portion of the plate or support I in the form of construction shown.

The lever or arm B is pivoted or supported so that it can swing or oscillate, and has at one end an elongated slot, $a'$, adapted and arranged to receive a pin or stud, $a$, located at or near the end of the arm A′, so that when the bar A is reciprocated the arm or lever will be oscillated. This end of the lever may rest on the arm A′. The other end, $b$, of this lever, as shown, is elevated, so as to be above the upper face of the frame or support I, so as to operate the pawl or dog C.

The pawl or dog C has its rear end provided with a suitable opening to receive a pin or pivot, $b'$, located on the end $b$ of the lever or arm B, and its forward end, $c$, is arranged to engage with the wheel or disk F, and, as shown, has its under face inclined at $c'$, to facilitate the return movement, and has a curved portion, $c''$, on its outer face to prevent side movement and a projecting wing or flange, $c'''$, for throwing the end $c$ into the proper position for engagement. This dog C is given a forward-and-back movement by the oscillating movement of the lever or arm B.

The lower dog or pawl, D, has its rear end resting on the arm A″, and is pivoted to said arm by a pin or pivot, $d'''$, located on the ear $d^4$, so as to have a slight vertical movement at each end, the movement in one direction being limited by the stop or rest $d''$ on the rear end. The forward end of this pawl or dog D has a point, $d$, to engage with the wheel F, the upper end of which has a curved surface, $d'$, to facilitate the withdrawal of the pawl. This pawl is given a forward-and-back movement by the reciprocating movement of the arm A″.

The relation and arrangement of the lever or arm B to the arm A″ are such that when the end $b$ of the lever or arm is advanced the arm A″ will recede, so that the pawl C will be carried forward and the pawl D will be carried back, and on the reverse movements of the lever and the arm A″ the pawl C will be carried back and the pawl D will be carried forward, so that the action of each pawl or dog will be a push action on the wheel or disk F, and will be exerted on the same side of the wheel in each instance.

The wings E are located around the periphery of the seed wheel or disk, and are so formed as to have a notch or opening, $e$, with which the ends $c$ $d$ of the pawls will engage, and an end notch or opening, $e'$, to be engaged by a point or catch, $b''$, located on the end $b$ of the lever B, for the purpose of stopping the rotation of the wheel when the pawl C ceases to act, and a straight face or side, $e''$, with which a stop, $g$, located on the end of the lever which has the slot $a'$, will engage for the purpose of stopping the rotation of the wheel or disk F when the pawl D ceases to act. The stops $b''$ and $g$ are so located as to stop the wheel at the completion of each forward or push action of the pawls, and be withdrawn as each forward or push action commences.

The seed wheel or disk F has a series of seed cells or cavities, which, as shown, are formed in an independent annular ring, F′, fitting into a corresponding recess in the face of the wheel, each cell or cavity having an annular flange, $f$, around it, which enters corresponding holes in the wheel and retains or locks the ring and wheel together. As shown, the ring F′ has a notch, $f^4$, to receive a pin, $f'$, in the face of the wheel and insure the proper centering of the openings in the ring with the openings in the wheels, which openings J form the seed cells or cavities. This wheel or disk F has a central opening to receive a pin or pivot, G, located on the plate H, so as to allow the disk or wheel to revolve thereon, and this plate H forms a support for the wheel or disk, and has an opening, J′, with which each seed cell or cavity J can be brought into line in succession, so as to produce the required communication between the seed-hopper and the seed-tube, the opening J′ being located over the mouth of the seed-tube.

The frame or support I has side pieces with openings $i$, for attachment to the frame of the planter, and a depressed portion for the bar A, the plate or support H being formed with the side pieces. The corners or lugs $i'$, located in the upper face of the side pieces, form guides or supports for the hopper or box, and the studs or projections $h$ support the plate which carries the cut-off, which plate is not shown. As shown, the stud $h$, next to the pawl C, forms a stop to prevent the pawl from being thrown out on its return movement, so as not to fall into position for engaging the notch $e$.

The pin or pivot K for the lever B, as shown, is located on the frame I, so as to form a stop to limit the forward movement of the reciprocating bar.

Only such parts of a complete planter as relate to my invention are shown. The remaining parts may be of any of the well-known forms of construction.

The operation is as follows: The cells or cavities each receive a charge of seed, and each in succession is brought beneath the cut-off and over the opening J′ by the rotation of the wheel F. The wheel is rotated by the pushing action of the pawls or dogs C D, each of which has a forward movement when acting on the wheel. The pawl C acts on the return movement of the pawl D, and the pawl D on the return movement of the pawl C, the pawls each having a stroke sufficient to engage each alternate wing E in their forward movements, so that when the wheel is rotated by either pawl the other pawl, in its return movement, will pass the wing which is engaged and fall into position back of the next wing, ready for work, and these movements will continue as long as the wheel or disk is to be rotated.

In the return movement of the pawl C the incline $c''$ rides over the point or wing with which the pawl D is engaged, and the pawl passes that point and falls into position with its end $c$ to engage the notch $e$ of the next succeeding wing, producing no action on the wheel in this return movement, and the curved end $d'$ of the pawl D passes the point or wing E, with which the pawl C is engaged, and allows the pawl to fall into position with its end $d$ engaged with the notch $e$ of the next succeeding point or wing.

No movement of the wheel or disk F to any great extent takes place after the completion of the forward movement of each pawl, by reason of the engagement of the stop $g$ or the stop $e$ with the points or wings E.

What I claim as new, and desire to secure by Letters Patent, is—

1. In combination with a seed-wheel having a single series of engaging projections or teeth and a reciprocating slide having an extension or arm, $A''$, the pawls or dogs C D, operating on the single series of projections or teeth, in line with each other on the same side or edge of the seed-wheel from its center or pivot, one from the upper and the other from the under side or face of the wheel, substantially as and for the purposes specified.

2. The seed wheel or disk F, having a series of points or wings on its periphery provided with notches $e\ e'$, in combination with the pawls or dogs C D, oscillating arm or lever B, having the stop or catch $b''$, and a reciprocating bar or arm, substantially as and for the purposes specified.

3. The seed wheel or disk F, having a series of points or wings, E, on its periphery, provided with the notches $e$ and straight side $e''$, in combination with the pawls C D, oscillating arm or lever B, having the stop $g$, and a reciprocating bar or arm, substantially as and for the purposes specified.

4. The seed wheel or disk F, having a series of points or wings provided with engaging notches and faces, in combination with the pawls or dogs C D, oscilleting lever or arm B, having stops $g\ b''$, and a reciprocating bar or arm, substantially as and for the purposes specified.

5. The combination and arrangement of the oscillating lever or arm B, carrying a pawl or dog, C, with the reciprocating bar or arm carrying a pawl or dog, D, and seed wheel or disk having engaging teeth or wings, substantially as and for the purposes specified.

ALEXANDER HEARST.

Witnesses:
HENRY A. BUSH,
JAMES H. SMITH.